US009407754B1

(12) United States Patent
Benoit et al.

(10) Patent No.: US 9,407,754 B1
(45) Date of Patent: Aug. 2, 2016

(54) MULTI-GRANULAR AUTHENTICATION TECHNIQUES

(71) Applicant: QUALCOMM Incorporated, San Diego, CA (US)

(72) Inventors: Olivier Jean Benoit, San Diego, CA (US); Rishab Nithyanand, Port Jefferson, NY (US); Rosario Cammarota, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/622,742

(22) Filed: Feb. 13, 2015

(51) Int. Cl.
| | | |
|---|---|---|
| H04M 1/66 | (2006.01) | |
| H04M 1/725 | (2006.01) | |
| H04W 12/06 | (2009.01) | |
| H04L 29/06 | (2006.01) | |
| H04W 12/12 | (2009.01) | |

(52) U.S. Cl.
CPC ....... *H04M 1/72577* (2013.01); *H04L 63/1425* (2013.01); *H04W 12/06* (2013.01); *H04W 12/12* (2013.01)

(58) Field of Classification Search
CPC .............................. H04W 4/028; H04W 12/06
USPC ........... 455/414.1, 556.2, 411, 412.1; 380/46, 380/270; 709/217, 219; 705/75, 26.5, 705/14.52, 80
See application file for complete search history.

(56) References Cited

U.S. PATENT DOCUMENTS

| | | | |
|---|---|---|---|
| 2008/0215623 A1* | 9/2008 | Ramer | .............. G06F 17/30749 |
| 2009/0249460 A1 | 10/2009 | Fitzgerald et al. | |
| 2012/0046012 A1 | 2/2012 | Forutanpour et al. | |
| 2012/0303476 A1* | 11/2012 | Krzyzanowski | .......... G06F 8/60 705/26.5 |
| 2013/0102283 A1* | 4/2013 | Lau | ....................... H04W 12/06 455/411 |
| 2013/0326600 A1 | 12/2013 | Sorek | |
| 2014/0282877 A1 | 9/2014 | Mahaffey et al. | |
| 2014/0289819 A1 | 9/2014 | Lindemann | |

OTHER PUBLICATIONS

Apple M7, Wikipedia, the free encyclopedia, Retrieved date on Nov. 5, 2014, Retrieved from the Internet < URL: http://en.wikipedia.org/wiki/Apple_M7 >, 4 pages.
Carlon K., "What to do if you forget your pattern lock on the Galaxy S3 or S4," Feb. 2014, Retrieved date on Nov. 5, 2014, < URL: http://www.androidpit.com/bypass-lockscreen-on-s3-and-s4 >, 5 pages.
International Search Report and Written Opinion—PCT/US2016/013345—ISA/EPO—Apr. 26, 2016—13 pgs.

(Continued)

*Primary Examiner* — Kiet Doan
(74) *Attorney, Agent, or Firm* — Hunter Clark PLLC

(57) ABSTRACT

Techniques for authenticating a user of a mobile device at a computing platform are provided. A method according to these techniques includes generating a first profile and second profile of user behavior for the user of the mobile device, the first profile comprising a first type of profile having at least a first duration and the second profile comprising a second type of profile having a second duration that is shorter than the first duration, monitoring user behavior to generate usage behavior data, comparing the usage behavior data to the first profile and the second profile, performing a first type of authentication action responsive to the usage behavior data deviating from the first profile, and performing a second type of authentication action responsive to the usage behavior data deviating from the second profile.

33 Claims, 9 Drawing Sheets

(56) References Cited

OTHER PUBLICATIONS

Jakobsson, M., Shi, E., Golle, P., & Chow, R. (Aug. 11, 2009). Implicit Authentication for Mobile Devices. Proceedings of the 4th USENIX Conference on Hot Topics in Security (HotSec), 6 pgs. Retrieved on Nov. 17, 2011 from http://www.pare.com/content/attachments/Jakobsson-Shi-HotSec09.pdf [XP055012369].

Safa, N. A., & Safavi-Naini, R. (Jun. 21, 2010). Authentication of Mobile Devices from User Behavior. Network Security and Cryptography Workshop, 9 pgs. Toronto, Ontario. Retrieved on Nov. 17, 2011 from http://www.mitacs.ca/events/images/stories/focusperiods/security-presentations/safaauthentication.pdf [XP0026637751].

* cited by examiner

Mobile Device

Mobile Device

Authenticate User of Mobile Device

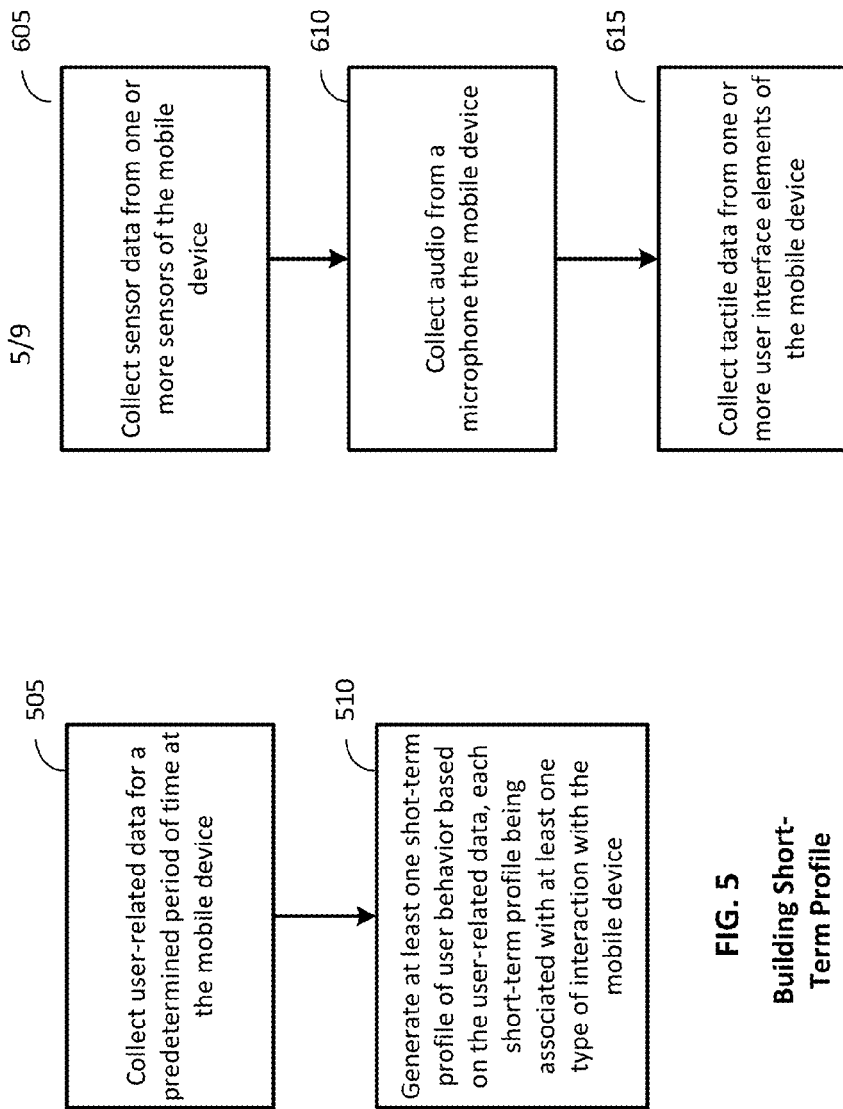

Building Long-Term Profile

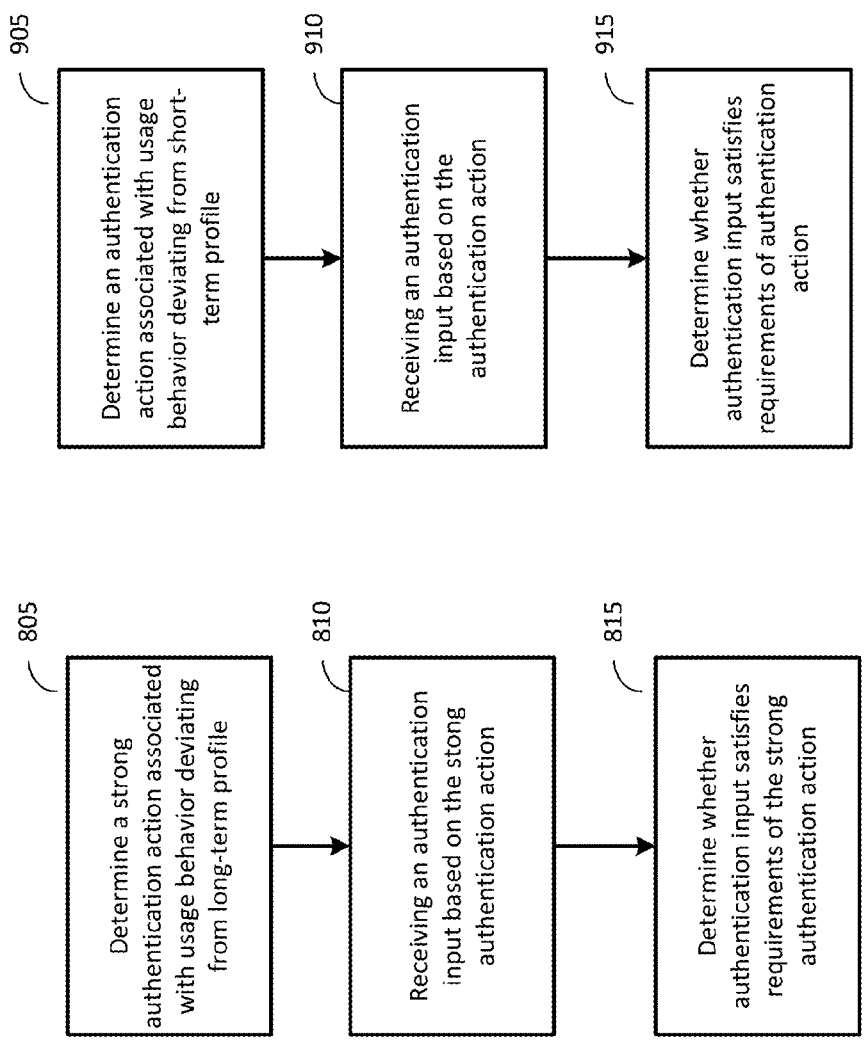

MULTI-GRANULAR AUTHENTICATION TECHNIQUES

BACKGROUND

Conventional solutions for providing security on a mobile device include One Time Authentication (OTA) and Interaction-Based Authentication (IBA). OTA techniques can include authenticating a user by their fingerprint or using a password, but these and other OTA approaches are vulnerable to the credentials being stolen and used to unlock the device or the device being stolen after user has already logged into the device. IBA techniques can include analyzing accelerometer data patterns and/or swipe patterns to identify authorized user of device, but IBA is vulnerable to template theft and mimicry attacks, which can be used to mimic the behavior of an authorized user of a mobile device over a short period of time in order to gain access to the mobile device.

SUMMARY

A method for authenticating a user of a mobile device at a computing platform, according to the disclosure herein, includes generating a first profile and second profile of user behavior for the user of the mobile device, the first profile comprising a first type of profile having at least a first duration and the second profile comprising a second type of profile having a second duration that is shorter than the first duration, monitoring user behavior to generate usage behavior data, comparing the usage behavior data to the first profile and the second profile, performing a first type of authentication action responsive to the usage behavior data deviating from the first profile, and performing a second type of authentication action responsive to the usage behavior data deviating from the second profile.

Implementations of such a method may include one or more of the following features. Monitoring the user behavior to generate the usage behavior data includes monitoring the user behavior while the mobile device is in a sleep state. Performing the first type of authentication action or the second type of authentication action includes performing an authentication procedure which locks the mobile device until an authentication input is received by the mobile device. Performing the first type of authentication action comprises performing a strong authentication procedure which locks the mobile device until a strong authentication input is received by the mobile device, the strong authentication input being different from the authentication input required in the second type of authentication action. Generating the second profile includes collecting user-related data for a predetermined period of time at the mobile device during a training period and generating the second profile based on the user-related data. Generating the first profile includes collecting user-related data at the mobile device during a training period and generating the first profile based on the user-related data. Performing the second type of authentication action includes determining an authentication action associated with the user behavior, receiving an authentication input based on the authentication action, and determining whether the authentication input satisfies requirements of the authentication action. Performing the first type of authentication action comprises determining a strong authentication action associated with the user behavior, receiving an authentication input based on the strong authentication action, and determining whether the authentication input satisfies requirements of the strong authentication action.

An apparatus according to the disclosure includes means for generating a first profile and second profile of user behavior for a user of a mobile device, the first profile comprising a first type of profile having at least a first duration and the second profile comprising a second type of profile having a second duration that is shorter than the first duration, means for monitoring user behavior to generate usage behavior data, means for comparing the usage behavior data to the first profile and the second profile, means for performing a first type of authentication action responsive to the usage behavior data deviating from the first profile, and means for performing a second type of authentication action responsive to the usage behavior data deviating from the second profile.

Implementations of such an apparatus may include one or more of the following features. The means for monitoring the user behavior to generate the usage behavior data includes means for monitoring the user behavior while the mobile device is in a sleep state. The means for performing the first type of authentication action or the second type of authentication action includes means for performing an authentication procedure which locks the mobile device until an authentication input is received by the mobile device. The means for performing the first type of authentication action includes means for performing a strong authentication procedure which locks the mobile device until a strong authentication input is received by the mobile device, the strong authentication input being different from the authentication input required in the second type of authentication action. The means for generating the second profile includes means for collecting user-related data for a predetermined period of time at the mobile device during a training period and means for generating the second profile based on the user-related data. The means for generating the first profile includes means for collecting user-related data at the mobile device during a training period, and means for generating the first profile based on the user-related data. The means for performing the second type of authentication action includes means for determining an authentication action associated with the user behavior, means for receiving an authentication input based on the authentication action, and means for determining whether the authentication input satisfies requirements of the authentication action. The means for performing the first type of authentication action includes means for determining a strong authentication action associated with the user behavior, means for receiving an authentication input based on the strong authentication action, and means for determining whether the authentication input satisfies requirements of the strong authentication action.

An computing device comprising according to the disclosure includes a processor configured to generate a first profile and second profile of user behavior for a user of a mobile device, the first profile comprising a first type of profile having at least a first duration and the second profile comprising a second type of profile having a second duration that is shorter than the first duration, monitor user behavior to generate usage behavior data, compare the usage behavior data to the first profile and the second profile, perform a first type of authentication action responsive to the usage behavior data deviating from the first profile, and perform a second type of authentication action responsive to the usage behavior data deviating from the second profile.

Implementations of such a computing device comprising may include one or more of the following features. The processor is configured to monitor the user behavior while the mobile device is in a sleep state. The processor being configured to perform the first type of authentication action or the second type of authentication action is further configured to perform an authentication procedure which locks the mobile device until an authentication input is received by the mobile device. The processor being configured to perform the first type of authentication action is further configured to perform a strong authentication procedure which locks the mobile device until a strong authentication input is received by the mobile device, the strong authentication input being different from the authentication input required in the second type of authentication action. The processor being configured to generate the second profile is configured to collect user-related data for a predetermined period of time at the mobile device during a training period and to generate the second profile based on the user-related data. The processor being configured to generate the first profile is configured to collect user-related data at the mobile device during a training period and to generate the first profile based on the user-related data. The processor being configured to perform the second type of authentication action is configured to determine an authentication action associated with the user behavior, to receive an authentication input based on the authentication action, and determine whether the authentication input satisfies requirements of the authentication action. The processor being configured to perform the first type of authentication action is configured to determine a strong authentication action associated with the user behavior, to receive an authentication input based on the strong authentication action, and to determine whether the authentication input satisfies requirements of the strong authentication action.

A non-transitory, computer-readable medium, having stored thereon computer-readable instructions for authenticating a user of a mobile device according to the disclosure includes instructions configured to cause a computer to generate a first profile and second profile of user behavior for the user of the mobile device, the first profile comprising a first type of profile having at least a first duration and the second profile comprising a second type of profile having a second duration that is shorter than the first duration, monitor user behavior to generate usage behavior data, compare the usage behavior data to the first profile and the second profile, perform a first type of authentication action responsive to the usage behavior data deviating from the first profile, and perform a second type of authentication action responsive to the usage behavior data deviating from the second profile.

Implementations of such a non-transitory, computer-readable medium may include one or more of the following features. The instructions configured to cause the computer to monitor the user behavior to generate the usage behavior data include instructions configured to cause the computer to monitor the user behavior while the mobile device is in a sleep state. The instructions configured to cause the computer to perform the first type of authentication action or the second type of authentication action include instructions configured to cause the computer to perform an authentication procedure which locks the mobile device until an authentication input is received by the mobile device. The instructions configured to cause the computer to perform the first type of authentication action include instructions configured to cause the computer to perform a strong authentication procedure which locks the mobile device until a strong authentication input is received by the mobile device, the strong authentication input being different from the authentication input required in the second type of authentication action. The instructions configured to cause the computer to generate the second profile include instructions configured to cause the computer to collect user-related data for a predetermined period of time at the mobile device during a training period and generate the second profile based on the user-related data. The instructions config-ured to cause the computer to generate the second profile include instructions configured to cause the computer to collect user-related data at the mobile device during a training period; and generate the second profile based on the user-related data. The instructions configured to cause the computer to perform the second type of authentication action responsive to the usage behavior data deviating from the second profile comprise instructions configured to cause the computer to determine an authentication action associated with the user behavior, receive an authentication input based on the authentication action, and determine whether the authentication input satisfies requirements of the authentication action. The instructions configured to cause the computer to perform the first type of authentication action include instructions configured to cause the computer to determine a strong authentication action associated with the user behavior, receive an authentication input based on the strong authentication action, and determine whether the authentication input satisfies requirements of the strong authentication action.

BRIEF DESCRIPTION OF THE DRAWINGS

FIG. 5 is a flow diagram of a process for generating a short-term profile for a user of the mobile device according to the techniques discussed herein.

FIG. 6 is a flow diagram of a process for collecting user-related data at a mobile device according to the techniques discussed herein.

FIG. 8 is a flow diagram of a process for performing an authentication action responsive to a long-term profile mismatch according to the techniques discussed herein.

FIG. 9 is a flow diagram of a process for performing an authentication action responsive to a short-term profile mismatch according to the techniques discussed herein.

DETAILED DESCRIPTION

Techniques are disclosed herein for providing multi-granular authentication on a mobile device. The techniques disclosed herein can utilize multiple levels of authentication to ensure that a user of the mobile device is the authorized user of the mobile device. The techniques disclosed herein can utilize OTA and/or IBA techniques in combination with Profile-Based Authentication (PBA). The PBA techniques disclosed herein can be used to generate a first type of profile of user behavior for the user of a mobile device, and IBA techniques can be used to generate a second type of profile of user behavior for the user of the mobile device. The first type of profile is also referred to herein as a long-term profile, and the second type of profile is also referred to herein as a short-term profile. The PBA techniques disclosed herein can be used to generate a long-term user profile based on observed user behavior over a much longer time period than is typically utilized with IBA techniques. IBA techniques can be used to generate one or more short-term profiles of user behavior that reflect a user's interaction with the mobile device for a duration of a few sets or longer. The long-term profile can be generated that includes a model of the user's expected behavior over hours, days, weeks, or months. The long-term profile for the authorized user of the mobile device can continue to evolve over time as the expected behavior patterns of the user are learned by the mobile device.

Figure 10:
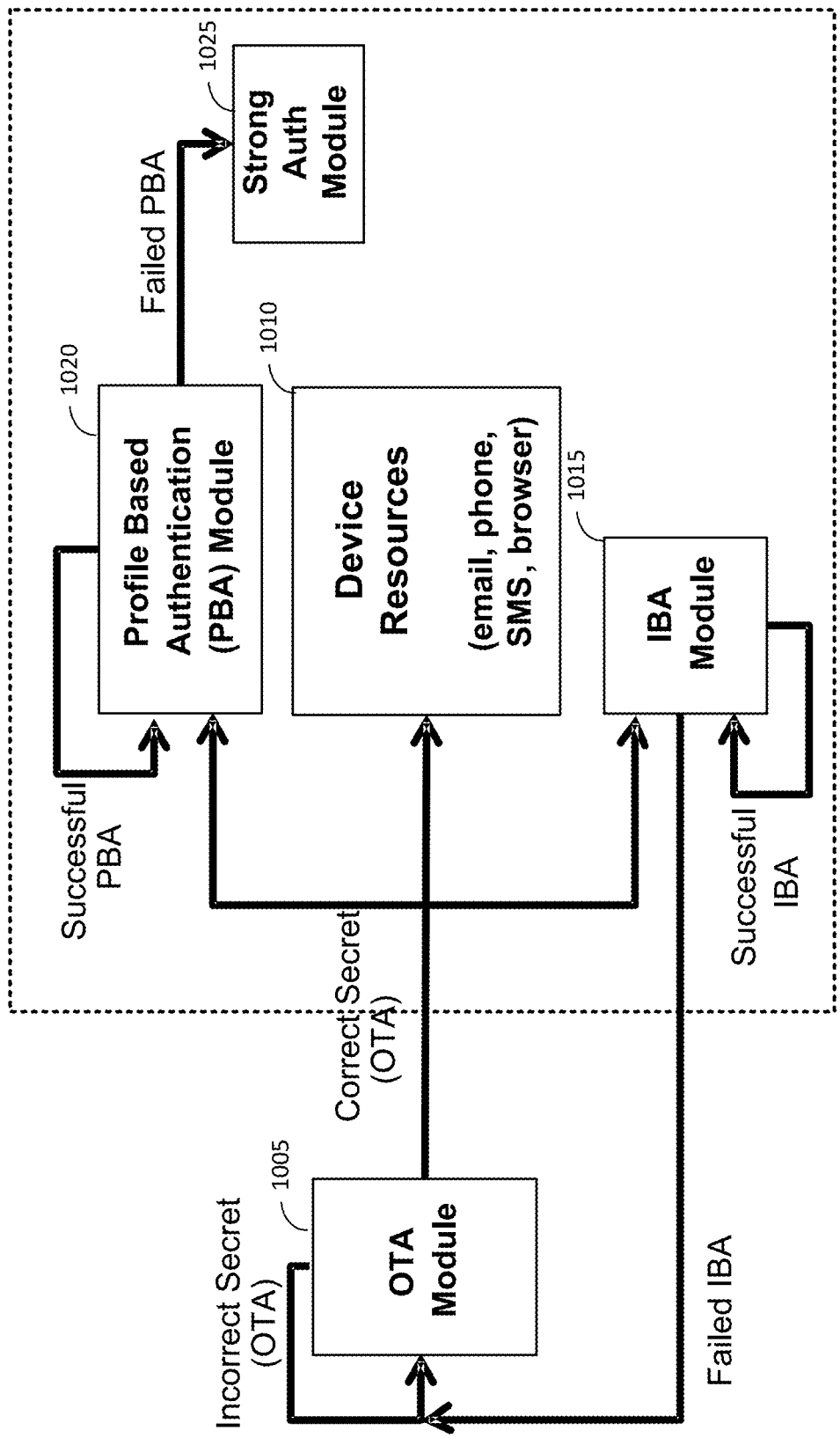
FIG. 10 is a diagram illustrating the logical components of a multi-granular authentication system according to the techniques discussed herein.

The PBA techniques discussed herein can be used with OTA and/or IBA techniques to create a multi-granular system for preventing others from accessing the device even if an unauthorized user were able to thwart the OTA or IBA protections. FIG. 10 provides a logical diagram illustrating an example implementation in which OTA, IBA, and PBA techniques have been integrated into a multi-granular authentication system for a mobile device according to the techniques discussed herein. The example system includes an OTA module 1005 that is configured to perform OTA authentication. The OTA module 1005 is configured to lock access to the mobile device and to require the user of the mobile device to provide an authentication input in order to gain access to the mobile device. For example, the OTA module 1005 can be configure to present the user of the mobile device with lock screen that prompts the user of the mobile device to provide an authentication input. The OTA module 1005 can be configured to prevent the user of the mobile device from otherwise utilizing the mobile device until the correct authentication input is provided. For example, the OTA module 1005 can be configured to require that the user of the mobile device enter a password or personal identification number (PIN) to unlock the mobile device. The OTA module 1005 can be configured to require that the user of the mobile device enter a swipe code or swipe pattern to unlock the mobile device, in which the user of the mobile device traces and/or touches a geographic pattern on a touchscreen of the mobile device. The OTA module 1005 can also be configured to require that the user of the mobile device scan a fingerprint using a fingerprint scanner of the mobile device. As illustrated in FIG. 10, if an incorrect authentication input is provided, OTA module 1005 can keep the mobile device in a locked state, preventing further usage of the mobile device. Otherwise, if the user of the mobile device provides a correct authentication input, the OTA module can allow the user of the mobile device to access the mobile device resources 1010. The mobile device resources 1010 can include, but are not limited to, placing and/or receiving phone calls, accessing and/or sending email, accessing and/or sending text messages, and/or accessing the Internet via the mobile device's browser. The IBA module 1015 and the PBA module 1020 can monitor the user's behavior by monitoring data collected from the input devices, such as the touchscreen, keyboard, etc. of the mobile device, and/or sensors of the mobile device.

The IBA module 1015 can be configured to continually monitor the user's interactions with the mobile device and to compare the user's interactions with the mobile device with one or more short-term profiles reflecting anticipated user interactions with the mobile device. For example, the IBA module 1015 can be configured to monitor a typing pattern of the user of the mobile device and/or a swipe pattern of the user of the mobile device and to determine whether the observed patterns are different than expected patterns of usage stored in one or more short-term user profiles associated with an authorized user of the mobile device. The IBA module 1015 can be configured to lock the mobile device and to activate the OTA module 1005 responsive to the observed patterns of behavior differing from the expected patterns of usage stored in the one or more short-term user profiles. The user of the mobile device would then be required to provide a correct authentication input to the OTA module 1005 to continue accessing the mobile device resources 1010 or the device would be locked. The use of the IBA module 1015 in combination with the OTA module 1005 provides an added level of security to the mobile device. Even if an unauthorized user were to take the device after the authorized user of the mobile device unlocked the device, the unauthorized user of the mobile device would have to then mimic the interactions of the user of the mobile device or the IBA module 1015 would lock the device and activate the OTA module 1005.

The PBA module 1020 can be configured to continually monitor the user's interactions with the mobile device in parallel with the IBA module 1015. The PBA module 1020 can compare the user's interactions with the mobile device with one or more long-term profiles reflecting anticipated user interactions with the mobile device over a longer period of time. The PBA module 1020 can be configured to monitor longer term behavior of the user than the PBA module 1020. For example, the long-term profile of the user device can include expected geographic location, expected days and/or times associated with each of the expected geographic locations, expected device usage, expected activities, or a combination thereof. The long-term profile information can include a model of user behavior that reflects when the user is expected to be home, at work, commuting to or from work, or at other locations. The long-term profile can also include expected device usage, such as specific days and/or time when the user uses the mobile device to browse the web, text, play games, place calls, or other usage information. The long-term profile can also include expected activities of the user, such as whether the user is typically running, walking, biking, etc. during specific days and/or times. The PBA module 1020 can be configured to monitor the user's interactions with the mobile device even while the mobile device is in a sleep state or a low power state, and can trigger a strong authentication procedure. For example, the PBA module 1020 can continue to collect information related to geographical location and user activities even while the phone is in a sleep state or other low power state. Examples of strong authentication procedures are discussed below. The PBA module 1020 can be configured to lock the mobile device and to require a strong authentication input to be provided responsive to the observed patterns of behavior differing from the expected patterns of usage stored in the one or more long-term user profiles. The strong authentication module 1025 can be configured to select a strong authentication procedure or procedures to be performed and to determine whether the user has provided a satisfactory response. The strong authentication module 1025 can be configured to maintain the mobile device in a locked state until the user of the device provides the requested strong authentication response. The strong authentication response can comprise a password or PIN that is longer and/or more difficult to guess than the authentication input required by the OTA module 1005. Accordingly, even if an unauthorized user of the mobile device were able to obtain a valid authentication input that could bypass the OTA module 1005, the unauthorized user would be likely to trigger the PBA module 1020 to lock down the device using a strong authentication procedure responsive to the unauthorized user's behavior deviating from the expected behavior of the authorized user of the mobile device included in the long-term profile.

The multi-granular authentication techniques disclosed herein can make the cost of attacking the security system of the mobile device prohibitively expensive. Even if an unauthorized user were to determine the authentication inputs required by the OTA module 1005 and successfully mimic the interactions of the authorized user included in the at least one short-term profile used by the IBA module 1015, the unauthorized user would still be extremely unlikely to be able to mimic the long-term behavior of the authorized user of the mobile device sufficiently in order to avoid having to perform the strong authentication procedure, much less to successfully circumvent the strong authentication procedure.

Figure 11:
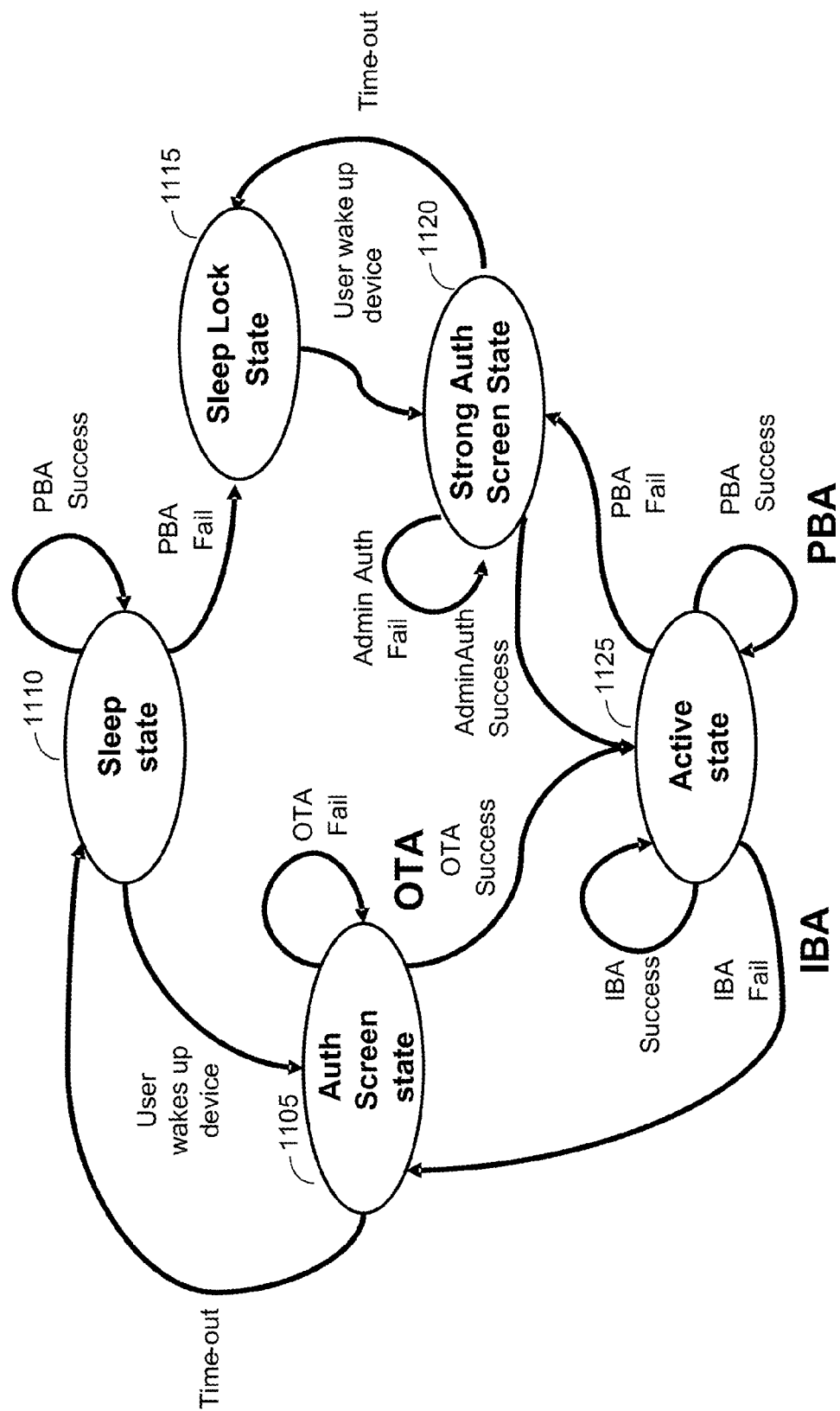
FIG. 11 is a state transition diagram illustrating an example implementation of the techniques discussed herein.

FIG. 11 is a state transition diagram that illustrates the concepts discussed above with respect to FIG. 10. The example illustrated in FIG. 11 illustrates how the mobile device can transition between five possible states: an authentication screen state 1105, a sleep state 1110, a sleep lock state 1115, a strong authentication screen state 1120, and an active state 1125. While the example illustrated in FIG. 11 illustrates five possible states, other implementations may include states in addition to or instead of one or more of the states illustrated in FIG. 11.

The authentication screen state 1105 represents a state in which the user is prompted by the OTA module 1005 for an authentication input. The mobile device can be configured to enter the authentication screen state 1105 when the device is waken up from the sleep state 1110 by a user of the mobile device. The authentication screen state 1105 can also be entered if the user enters an incorrect authorization input at the authorization screen and the OTA module 1005 can be configured to return the mobile device can return to the authentication screen state 1105. The mobile device can be configured to move from the authentication screen state 1105 to the sleep state 1110 if a time-out condition occurs. For example, if the mobile device is in the authentication screen state 1105 and no input is provided within a predetermined period of time, the mobile device can be configured to transition to the sleep state 1110 in order to conserve power. The OTA module 1005 can also be configured to transition the mobile device from the authentication screen state 1105 to the active state 1125 responsive to the user providing a correct authorization input.

The active state 1125 represents a state in which the mobile device is unlocked and the user of the mobile device has access to the mobile device resources 1010. The IBA module 1015 can transition back to the active state 1125 responsive to the IBA module 1015 determining that the observed user interactions with the mobile device matches that of one or more short-term user profiles. The IBA module 1015 can transition back to the authentication screen state 1105 responsive to determining that a user action does not match a short-term profile for the authorized user of the mobile device. The PBA module 1020 can also transition back to the active state 1125 responsive to the PBA module 1020 determining that the observed usage behavior matches that of the one or more long-term profiles associated with the user of the mobile device. The IBA module 1015 can transition to the strong authentication screen state 1120 responsive to determining that a user action does not match a long-term profile for the authorized user of the mobile device.

The strong authentication screen state 1120 represents a state in which the user is prompted by the strong authentication module 1025 for a strong authorization input. The strong authentication module 1025 can transition back to the active state 1125 responsive to a correct strong authorization input being provided by the user of the mobile device. If the user fails to provide a correct strong authorization input, the strong authentication module 1025 can transition back to the strong authentication screen state 1120. Furthermore, the strong authentication module 1025 can be configured to transition to the sleep lock state 1115 responsive to the user of the mobile device not providing a strong authorization input within a predetermined period of time.

The sleep lock state 1115 represents a low power sleep state that the mobile device can transition to while in the sleep state 1110 if the PBA module 1020 determines that the usage behavior of the user of the mobile device has deviated from the long-term profile associated with the authorized user of the mobile device while the mobile device was in the sleep state 1110. The PBA module 1020 can monitor the user's interactions with the mobile device even while the mobile device is in a sleep state or a low power state, and can trigger a strong authentication procedure. The strong authentication module 1025 can transition the mobile device from the sleep lock state 1115 to the strong authentication screen state 1120 responsive to the user of the mobile device waking the mobile device up from the sleep state.

Example Network Environment

Figure 1:
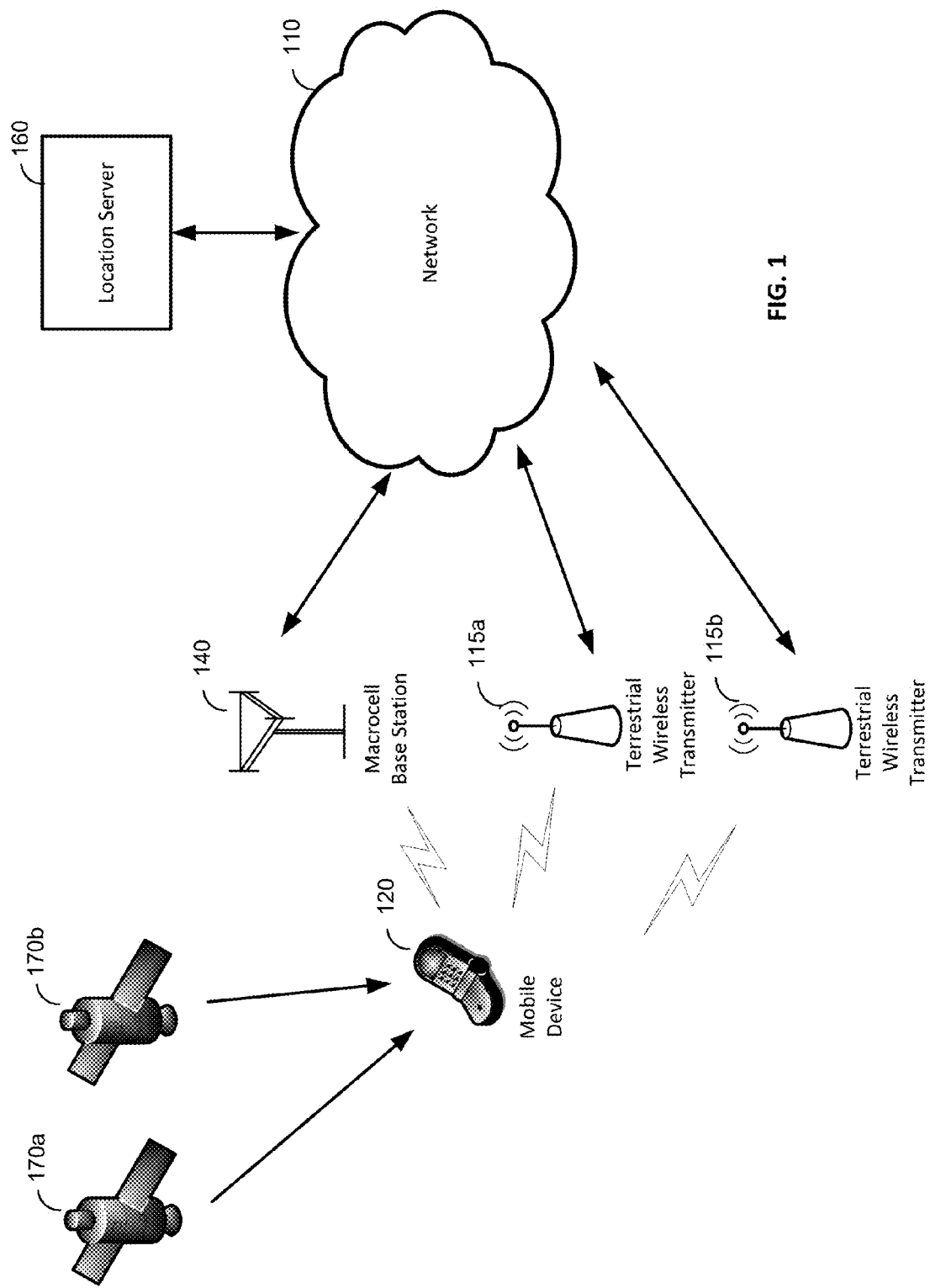
FIG. 1 is a block diagram of an example network architecture, which may be suitable for implementing the techniques discussed herein.

FIG. 1 is a block diagram of an example network architecture, which may be suitable for implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity.

The mobile device 120 may also be referred to as a User Equipment (UE), a mobile station, a terminal, an access terminal, a subscriber unit, a station, etc. The mobile device 120 may be a smartphone, a tablet computer, a laptop computer, or other device that includes a wireless transmitter that is configured to communicate using one or more wireless communications protocols, including, but not limited to, the Long Term Evolution (LTE), WiFi, and WiMAX wireless communications protocols. The mobile device 120 can also be configured to support other types of wireless communications protocols and can be configured to support multiple different wireless communications protocols. The wireless transmitter of the mobile device 120 can be configured to send data to and/or receive data from other mobile devices 120, the wireless transmitters 115, and/or one or more wireless base stations 140.

The mobile device 120 can also be configured to measure signals from one or more wireless base stations or wireless access points, such as the wireless transmitters 115 and the wireless base station 140, and obtain timing measurements (e.g., for time of arrival (TOA) or observed time difference of arrival (OTDOA)), signal strength measurements (e.g., Receive Signal Strength Indication (RSSI)), RTT (round-trip time) and/or signal quality measurements for the wireless base stations. The pseudo-range measurements, timing measurements, signal strength measurements, and/or signal quality measurements may be used to derive a location estimate for the mobile device 120. A location estimate may also be referred to as a position estimate, a position fix, etc. Two terrestrial wireless transmitters are illustrated in this example: 115a and 115b. However, in other implementations, more or less wireless transmitters 115 may be included. The mobile device 120 can also be configured to use a combination of signals from one or more of the satellites 170, the wireless base station 140, and/or the wireless transmitters 115 to determine a position of the mobile device 120.

Each of the wireless transmitters 115 can comprise a WLAN wireless access point configured to operate using the IEEE 802.11 wireless communication standards. But, in some implementations some or all of the wireless transmitters 115 may be configured to utilize other wireless communications protocols, and some network environments may include a more than one type of wireless transmitter 115. Furthermore, while the wireless transmitters 115 are identified as transmitters, the wireless transmitters 115 may be transceivers configured to send and/or receive data wirelessly. The wireless transmitters 115 can be connected to network 110 via a backhaul connection that provides a broadband connection to the network 110. The network 110 may be the Internet and/or a combination of one or more networks. For example, the wireless transmitter 115 may be connected to a DSL modem or a cable modem, depending upon the type of broadband service being used in that particular implementation. A wireless transmitter 115 can be associated with a mobile communication network provider and can be configured to communicate with the mobile communication network provider's network (not shown) via the network 110. The coverage area of the a wireless transmitter 115 may overlap with that of one or more macrocell base stations, such as wireless base station 140, or that of one or more other terrestrial transceivers.

The wireless base station 140 can be configured to provide wireless network connectivity to a plurality of mobile devices 120. The wireless base station 140 may comprise a macrocell base station or other type of base station. The wireless base station 140 may have a much larger coverage area than the wireless transmitter 115 or may be a terrestrial transceiver that provides a coverage area that is of a similar size or of a smaller size than the coverage area provided by the wireless transmitters 115. Wireless base station 140 can be configured to communicate using one or more wireless communications protocols. While the example illustrated in FIG. 1 includes on a single wireless base station 140, in other implementations the network environment is likely to include more than wireless base station 140 which have coverage areas that may overlap at least in part.

The mobile device 120 can be configured to include a Global Navigation Satellite System (GNSS) receiver configured to receive and measure signals from one or more satellites 170, such as satellites 170a and 170b, and to obtain pseudo-range measurements for the satellites 170. Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170a could belong to the GPS system while the satellite 170b could belong to the Galileo system. While the example network architecture illustrated herein illustrates only two satellites 170, other implementations may have more or less satellites available, may have satellites associated with one or more GNSS system, and the number of satellites visible to the mobile device 120 may depend upon the current geographical location of the mobile devices and the orbits of the satellites 170.

The location server 160 can be configured to provide location services to the mobile device 120. For example, the location server 160 can be configured to provide almanac information and/or other information that the mobile device 120 can use to determine the position of the mobile device 120. The location server 160 can also be configured to assist the mobile device 120 in determining the position of the mobile device 120. For example, the location server 160 can be configured to receive signal measurements of signals received at the mobile device 120 from wireless transmitters 115 and/or wireless base stations 140 and to determine a position of the mobile device 120 based on those signals. While the location server 160 is represented as a single entity in the example implementation illustrated in FIG. 1, the logical functions performed by the location server 160 discussed herein can be implemented by more than one network entity. In some implementations, the mobile device 120 can be configured to provide The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1.

Example Hardware

Figure 2:
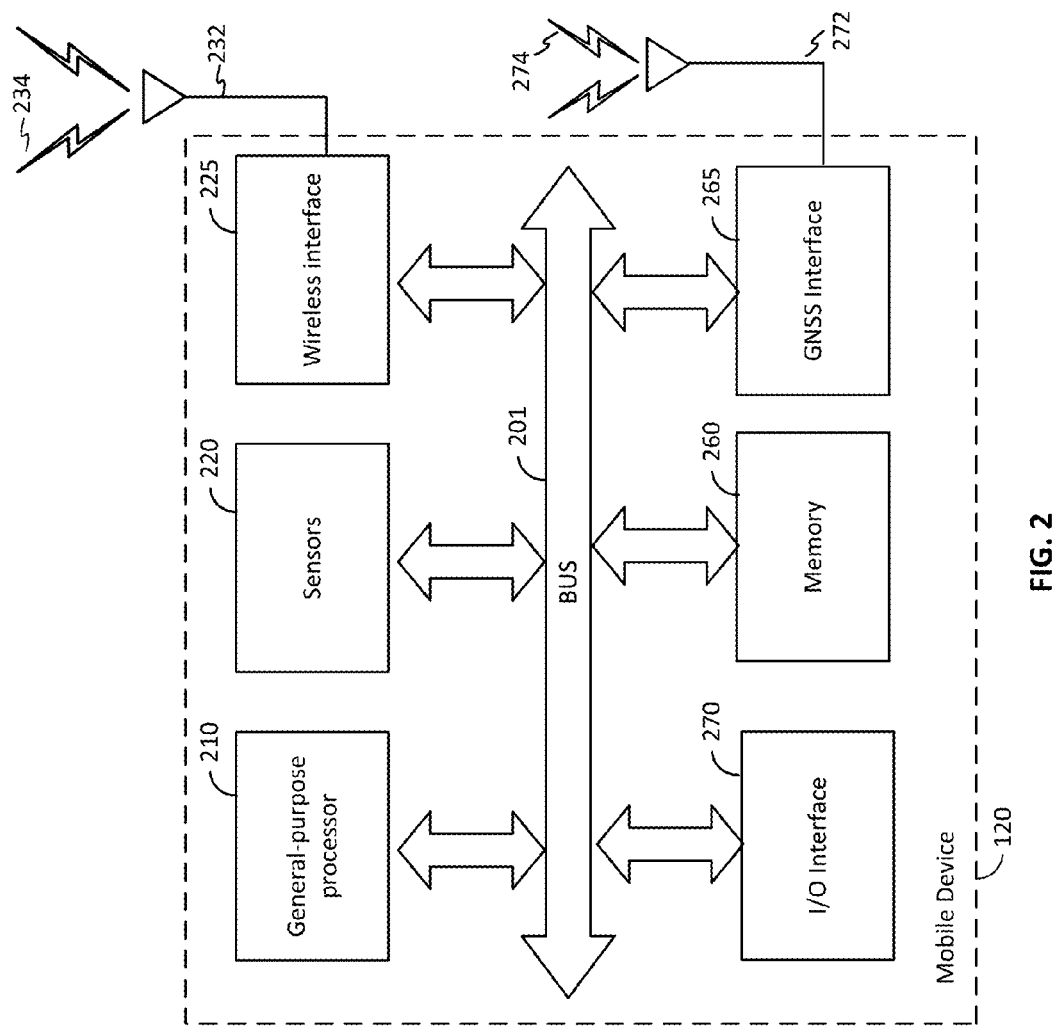
FIG. 2 is a block diagram of a mobile device that can be used to implement the mobile device illustrated in FIG. 1.

FIG. 2 is a block diagram of a mobile device that can be used to implement the mobile device 120 illustrated in FIG. 1. The mobile device 120 can be used to implement, at least in part, the processes illustrated in FIG. 4-11.

The mobile device 120 comprises a computer system including a general-purpose processor 210, sensors 220, a wireless interface 225, a GNSS interface 265, and a non-transitory memory 260, connected to each other by a bus 201. Other implementations of the mobile device 120 may include additional elements not illustrated in the example implementation of FIG. 2 and/or may not include all of the elements illustrated in the example embodiment illustrated in FIG. 2. For example, some implementations of the mobile device 120 may not include the GNSS interface 265.

The wireless interface 225 can include a wireless receiver, transmitter, transceiver, and/or other elements that enable the mobile device 120 to send and/or receive data using WWAN, WLAN, and/or other wireless communication protocols. The wireless interface 225 can comprise one or more multi-mode modems capable of transmitting and receiving wireless signals using multiple wireless communications standards. The wireless interface 225 is connected by a line 232 to an antenna 234 for sending and receiving communications to/from the wireless transmitters 115, the wireless base station 140, and/or other wireless devices configured to communicate using wireless communication protocols. While the mobile device 120 illustrated in FIG. 2 comprises a single wireless interface 225 and a single antenna 234, other implementations of the mobile device 120 can include multiple wireless interfaces 225 and/or multiple antennas 234.

I/O interface 270 can provide one or more ports and/or other interfaces that can provide for data inputs and/or outputs to the mobile device 120. For example, the I/O interface 270 can include one or more ports, such as a Universal Serial Bus (USB) port and/or other type of port that can be used to connect external devices to the mobile device. The I/O interface 270 can also include one or more input devices, such as buttons, switches, a keypad, a touchscreen and/or other means for receiving input from a user. The I/O interface 270 can also include one or more means for outputting audio and/or visual content, such as a screen, a speaker, a headphone port and/or other means for outputting such content.

The GNSS interface 265 can include a wireless receiver and/or other elements that enable the mobile device 120 to receive signals from transmitters associated with one or more GNSS systems. The GNSS interface 265 is connected by a line 272 to an antenna 274 for receiving signals from the GNSS transmitters, such as the satellites 170 illustrated in FIG. 1. The mobile device 120 can be configured to use signals received from satellites associated with satellites and other transmitters associated with the GNSS systems to determine a position of the mobile device 120. The mobile device 120 can also be configured to use the signals received from the satellites and other transmitters associated with the GNSS systems in conjunction with signals received from wireless transmitters 115 and/or wireless base stations 140 to determine a position of the mobile device 120.

The sensors 220 can comprise one or more sensors 220 that can be configured to collect data that can be used to generate profiles of user behavior for a user of the mobile device 120. The sensors 220 can include one or more of each of the following: an accelerometer, a fingerprint scanner, a gyroscope, a light sensor, a gesture sensor, a proximity sensor, or a combination thereof. Some of the sensors 220 may be integrated into the mobile device 120, which others may be external to the mobile device 120 and can provide sensor data to the mobile device 120 via a wired or wireless connection with the mobile device 120. The sensors 220 can also include other types of sensors in addition to or instead of those discussed herein.

The processor 210 can be an intelligent device, e.g., a personal computer central processing unit (CPU) such as those made by Intel® Corporation or AMD®, a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the wireless transmitters 115, the wireless base station 140, other mobile devices 120, and/or other devices configured for wireless communication.

Figure 3:
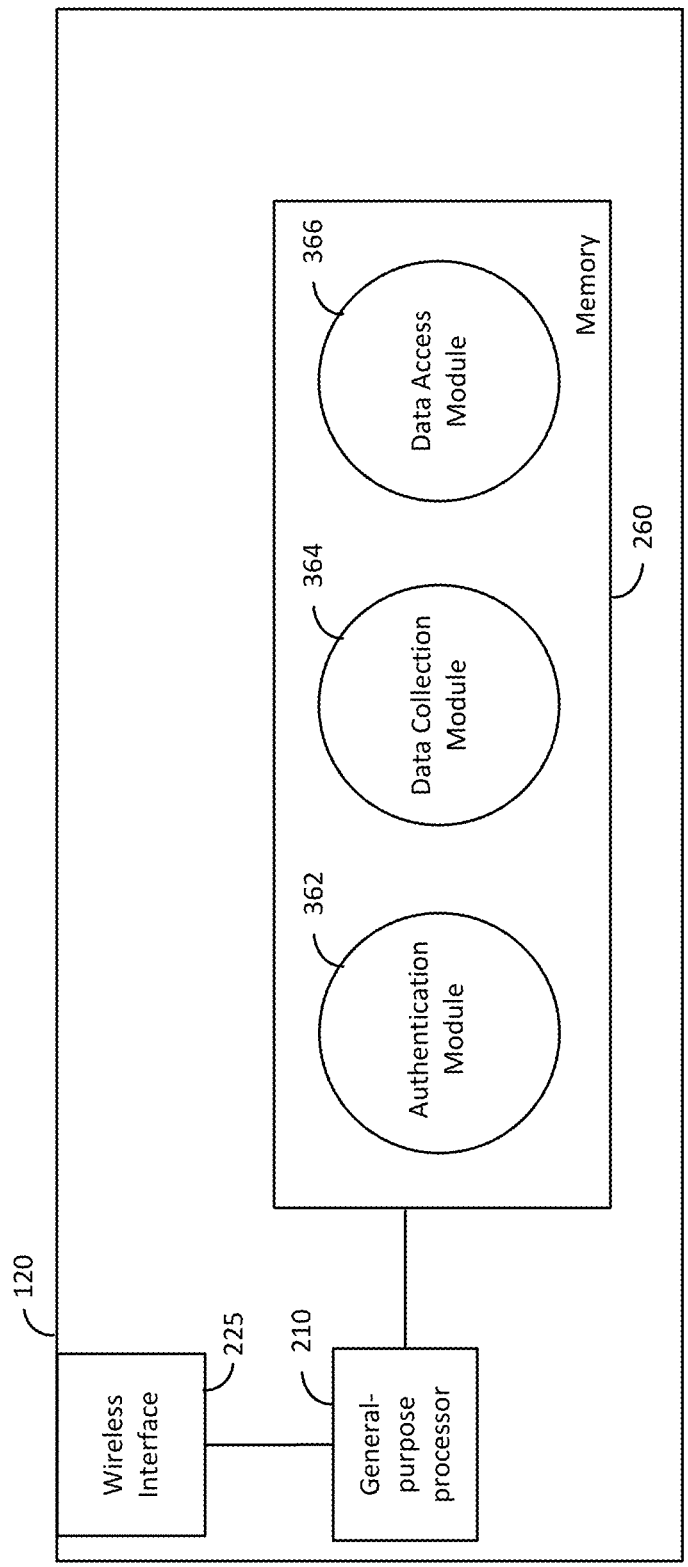
FIG. 3 is a functional block diagram of the mobile device illustrated in FIG. 2 that illustrates functional modules of the mobile device.

FIG. 3 is a functional block diagram of the mobile device 120 illustrated in FIG. 2 that illustrates functional modules of the memory 260 shown in FIG. 2. For example, the mobile device 120 can include an authentication module 362, a data collection module 364, and a data access module 366. The mobile device 120 may also include one or more additional functional modules that provide other functionality to the mobile device 120. The functional modules illustrated in FIG. 3 may be implemented as software as illustrated in FIG. 3 or may be implemented in hardware or a combination of hardware and software. The mobile device 120 illustrated in FIGS. 2 and 3 can be used to implement the mobile device 120 associated with the processes illustrated in FIGS. 4-11. The processor 210 can also provide means for implementing the various modules of the mobile device 120 discussed herein and may operate in conjunction with one or more modules implemented in firmware.

The authentication module 362 can provide means for implementing the method illustrated in FIGS. 4-11. The authentication module 362 can be configured to implement the functionality of the OTA module 1005, the IBA module 1015, the PBA module 1020, and the strong authentication module 1025 discussed above and illustrated in FIG. 10 as well as any specific functionality not directly associated with one of these modules in the state diagram illustrated in FIG. 11. The authentication module 362 can be configured to generate one or more short-term and/or long-term user profiles for an authorized user of the mobile device 120. The authentication module 362 can also be configured to monitor user behavior to determine whether the behavior of the user deviates from either a short-term profile or long-term profile associated with the user of the mobile device 120 and to perform an authentication action responsive to determining that the user behavior has deviated from the short-term user profile and/or the long-term user profile. The authentication module 362 can also be configured to perform one-time authentication procedures, such as requesting that a user of the mobile device 120 enter a password, and PIN code, or other identifier to temporarily unlock the mobile device 120.

A short-term profile can be used by the authentication module 362 of the mobile device 120 to perform interaction based authentication (IBA) to authenticate the user of the mobile device. A long-term profile can be used by the authentication module 362 of the mobile device 120 to perform profiled based authentication (PBA) to authenticate the user of the mobile device. The short-term profile can comprise a template that provides a model of how an authorized user of the mobile device 120 is expected to interact with the device over a predetermined period of time. For example, a short-term profile may comprise information that reflects an expected behavior of an authorized user of the mobile device over a period of time ranging from a few seconds to a few minutes. The specific duration of a short-term profile can vary and may depend in part on the type of user behavior being observed in the short-term profile. For example, the authentication module 362 of the mobile device 120 can be configured to generate a short-term profile for actions such as how the user holds the device (e.g. orientation), how the user swipes and/or types on the mobile device, or other actions that can be used to differentiate between the authorized user of the mobile device 120 and another user who is not authorized to use the mobile device 120. The data collection module 364 can be configured to collect data from one or more sensors 220, the GNSS interface 265, and/or the I/O interface 270, and the authentication module 362 can use the data from one or more of these sources to generate one or more short-term profiles for the user of the mobile device.

A long-term profile can comprise a template that provides a model of how an authorized user of the mobile device 120 is expected to behave over a longer period of time than that reflected in the short-term profiles. For example, a long-term profile may comprise information that reflects the expected behavior of an authorized user of the mobile device 120 over a longer period of time. For example, a long-term profile may include a template of expected user behavior over an hour, hours, a day, days, or even months. A long-term profile can continue to evolve as the authentication module 362 has time to identify expected patterns of behavior of the authorized user of the mobile device 120. A long-term profile for the authorized user of the mobile device may include numerous aspects of the authorized user's behavior, such as expected geographic location, expected days and/or times associated with each of the expected geographic locations, expected device usage, expected activities, or a combination thereof. The expected activities can include whether the mobile device is typically stationary at a particular day and/or time, whether the user is typically waking or running at a particular day and/or time, whether the user is typically driving at a particular day and/or time. The expected device usage behavior may include expected calling and/or texting behavior that models the expected times, frequencies, and contacts with which calls and/or texts are placed. The expected device usage behavior may also include expected browsing activity to access online content. The expected device usage behavior may also include expected application usage behavior, such as accessing specific music or video content and/or executing specific applications on specific days and/or times. The authentication module 362 can be configured to compare user behavior with the long-term user profile information and to require the user to perform a strong authentication procedure if the user's behavior deviates too much from the expected behavior, which may indicate that the mobile device 120 is in the possession of an unauthorized user. The data collection module 364 can be configured to collect data from one or more sensors 220, the GNSS interface 265, and/or the I/O interface 270, and the authentication module 362 can use the data from one or more of these sources to generate and/or update the one or more long-term profiles for the user of the mobile device. The data collection module 364 can also be configured to collected electronic calendar information associated with the user of the mobile device 120 from one or more sources of electronic calendar information. The authentication module 362 can be configured to use the calendar information to determine expected geographic location, expected days and/or times associated with each of the expected geographic locations, expected device usage, expected activities, or a combination thereof for the user.

The data collection module 364 can be configured to collect data from one or more sensors 220, the GNSS interface 265, and/or the I/O interface 270. The data collection module 364 can also be configured to provide the collected data to the authentication module 362, which can use the collected data to generating one or more short-term profiles and/or long-term profiles for the user of the mobile device and for determining whether usage behavior has deviated from the expected behavior based on the one or more short-term profiles and/or long-term profiles.

The data access module 366 can be configured to store data in the memory 260 and/or other data storage devices associated with the mobile device 120. The data access module 366 can also be configured to access data in the memory 260 and/or other data storage devices associated with the mobile device 120. The data access module 366 can be configured to receive requests from other modules and/or components of the mobile device 120 and to store and/or access data stored in the memory 260 and/or other data storage devices associated with the mobile device 120.

The long-term profiles, the short-term profiles, and the authentication procedures may be stored in the memory 260 of the mobile device or in another location of the mobile device. The profiles and the authentication procedures may be encrypted or otherwise rendered in accessible to users of the mobile device 120 and to applications being executed on the mobile device. A network service provider, manufacturers, or other provider of the mobile device 120 may be able to remotely access and reset the profile information in the event that a user is inadvertently locked out of their mobile device responsive to the user providing proof of identify to the entity.

Example Implementations

Figure 4:
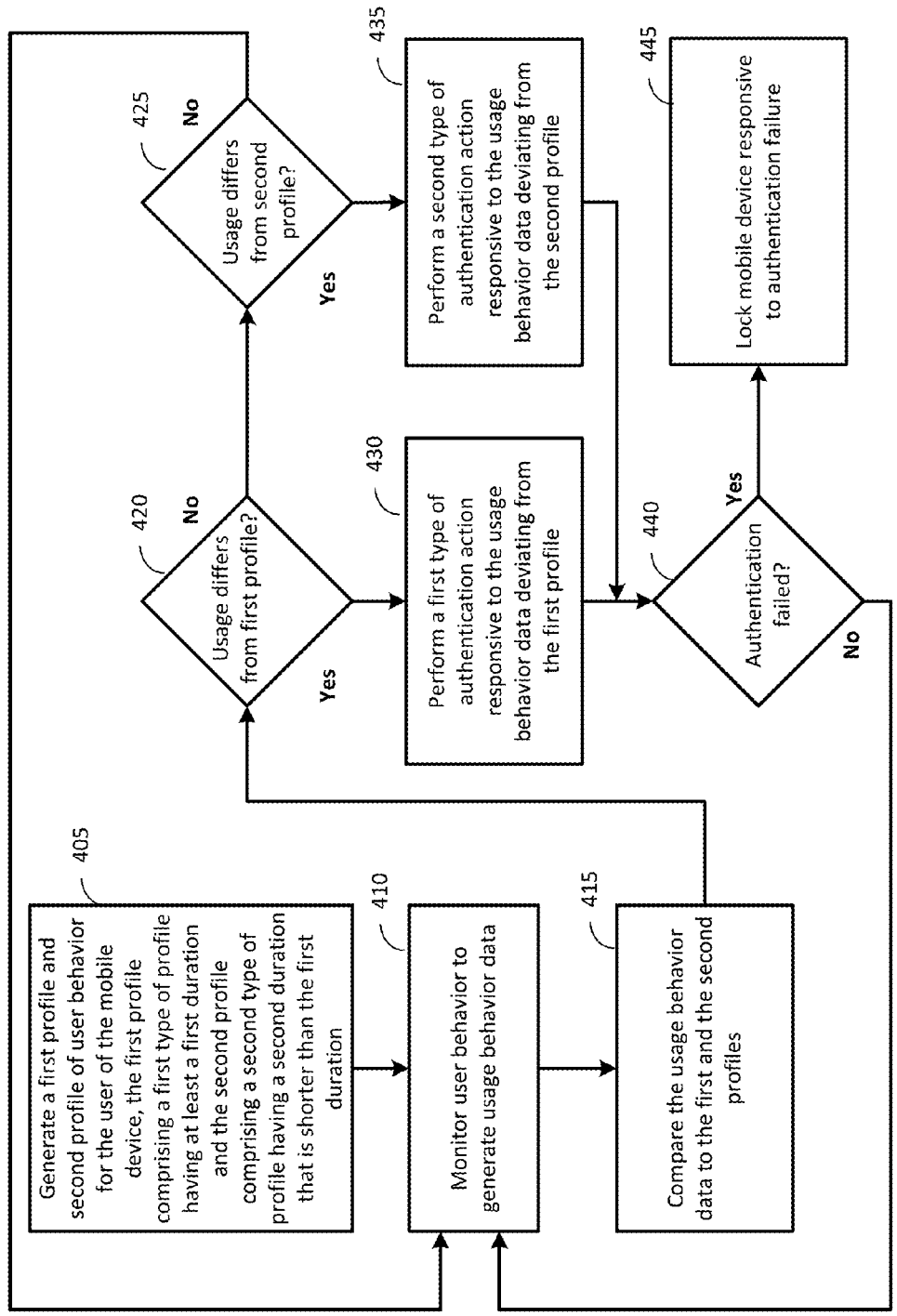
FIG. 4 is a flow diagram of a process for authenticating a user of a mobile device according to the techniques discussed herein.

FIG. 4 is a flow diagram of a process for authenticating a user of a mobile device according to the techniques discussed herein. The process illustrated in FIG. 4 can be implemented using the mobile device 120 illustrated in FIGS. 1-3, unless otherwise specified. The authentication module 362 of the mobile device 120 can provide means for performing the various stages of the process illustrated in FIG. 4 unless otherwise specified. The process illustrated in FIG. 4 can optionally begin with an OTA process in which the user of the mobile device 120 enters an authorization input to unlock the mobile device prior to stage 405.

A first profile and second profile of user behavior for the user of the mobile device can be generated (stage 405). The first profile can be a first type of profile having a least a first duration, and the second profile can be a second type of profile having a second duration that is shorter than the first duration. In other words, the first profile can comprise a long-term profile of the type described herein and the second profile can comprise a short-term profile of the type described herein. The short term profile and the long-term profile can be generated based on user behavior-related data collected by the mobile device 120. In some implementations, there may be more than one long-term profile and/or more than one short-term profile generated for a user. The user behavior-related data can be obtained from one or more sensors 220, the GNSS interface 265, and/or the I/O interface 270, and the authentication module 362 can use the data from one or more of these sources to generate one or more short-term profiles and/or one or more long-term profiles for the user of the mobile device. Some examples of the types of data that can be included in a short-term profile and the types of data that can be included in a long-term profile are discussed in greater detail above with respect to the authentication module 362 of the mobile device 120.

User behavior can be monitored to generate usage behavior data for the mobile device 120 (stage 410) and the usage behavior data can be compared to the first and the second profiles (stage 415). The usage behavior collected can be compared to the short-term profile and the long term profile associated with the authorized user of the mobile device 120 in stage 410. As discussed above, in some implementations, more than one short-term profile and/or more than one long-term profile may have been created for a user of the mobile device, and these multiple profiles can be compared to the usage behavior data in stage 415 if such multiple profiles are available. The authentication module 362 can be configured to operate the data collection module 364 to collect data from the sensors 220, the GNSS interface 265, and/or the I/O interface 270. The authentication module 362 can be configured to collect this information for comparison with the short-term profile and/or the long-term profile associated with the user of the mobile device 120. The authentication module 362 can be configured to access the one or more short-term profiles and the one or more long-term profiles associated with then authenticate user of the mobile device 120 from the memory 260 or another memory of the mobile device 120 via the data access module 366 and to compare the usage behavior data with the at least one short-term profile and the at least one long-term profile.

A determination can be made whether the usage behavior data differs from the first profile (stage 420). The determination can be made based on whether the usage behavior data deviates from the first profile (a long-term profile) associated with the user of the mobile device 120. The information included in the long-term profile can be associated with a threshold which the authentication module 362 will use to determine whether the usage data behavior differs from the long-term profile. If the difference between the usage behavior data and the data in the long-term profile, the authentication module 362 can be configured to determine that the usage behavior data differs from the long-term profile. The authentication module 362 can also be configured to determine whether a threshold number of profile items such as expected geographic location, expected days and/or times associated with each of the expected geographic locations, expected device usage, or expected activities differ between the usage behavior data and the long-term profile when determining whether the usage behavior data differs from the long-term profile data.

If the usage behavior data deviates too far from the first profile, a first type of authentication action can be performed (stage 430) and the process can continue with stage 440. The authentication module 362 can be configured to perform a first type of authentication action (also referred to herein as a strong authentication procedure) to authenticate the user of the mobile device 120. The first type of authentication action can provide a stronger level of authentication than that which the authentication module 362 requires in response to a difference between the usage behavior and a short-term profile of the user of the mobile device 120. The authentication module 362 can be configured to perform strong authentication in response to the usage behavior differing from a long-term profile of the user of the mobile device 120, because such a difference is indicative that the current user of the mobile device may not be the authorized user of the mobile device 120 for which the long-term profile was generated. An unauthorized user of the mobile device may be able to mimic the expected behavior of an authorized user of the mobile device 120 for a short period of time, but will not be able to mimic the expected behavior of the authorized user of the mobile device over a long period of time as reflected by the long-term profile. Such a deviation for the long-term profile causes the authentication module 362 to require the user provide information that would be more difficult for an unauthorized user of the mobile device to provide, such as a longer password or personal identification number (PIN) than is typically required to unlock the mobile device. The authentication module 362 can also be configured to perform other types of strong authentication procedures not expressly set forth herein instead or in combination with the strong authentication procedures discussed above.

If the usage behavior data does not deviate too far from the long-term profile, a determination whether the usage behavior deviates from the second profile can be made (stage 425). The determination can be made based on whether the usage behavior data deviates from the second profile (a short-term profile) associated with the user of the mobile device 120. If the usage behavior deviates too far from the short-term profile, a second type of authentication action can be performed and the process can continue with stage 440 (stage 435). Otherwise, if the usage behavior does not differ from the first profile or the second term profile, the process can continue with stage 410. The determinations of stages 420 and 425 can be performed for multiple profiles where multiple long-term profiles and/or short-term profiles are associated with a user of the mobile device 120. Stage 435 can be performed responsive to the usage behavior data deviating too far from any one of the multiple short-term profiles, and stage 430 can be performed responsive to the usage behavior data deviating too far from any one of the multiple long-term profiles.

A determination can be made whether the authentication action taken in either stage 430 or 435 failed (stage 440). If the authentication action failed, the mobile device can be locked responsive to the authentication failure (stage 445). The type of locking procedure that is applied can depend on the type of authentication action that was performed. For example, if the first type of authentication action was performed, which is associated with a profile-based authentication failure, the mobile device may be locked in such a way that the user of the mobile device may need to contact the network service provider and provide information verifying the user's identity to the network service provider in order to have the network service provider unlock the mobile device 120.

Otherwise, if the authentication action did not fail in either stage 430 or stage 435, the process can continue with stage 410 and/or with stage 405 where the first profile (a long-term profile) associated with the authorized user of the mobile device can continue to be refined. The authentication module 362 can continue to monitor user behavior to generate usage behavior data. The authentication module 362 can operate the data collection module 364 to collect data from the sensors 220, the GNSS interface 265, and/or the I/O interface 270. The authentication module 362 can be configured to continue to operate even while the mobile device 120 is in a sleep mode or other low power mode. The data collection module 364 can continue to collect data from the sensors 220, the GNSS interface 265, and/or the I/O interface 270 even while the mobile device 120 is in the sleep mode or other low power mode. In conventional authentication techniques, monitoring of the usage behavior of the user of the mobile device is not performed while the mobile device is in a sleep state. However, the techniques disclosed herein can continue to operate while the mobile device 120 is in such a state to identify user behavior that differs from the one or more long-term profiles of the user behavior.

FIG. 5 is a flow diagram of a process for generating a short-term profile for a user of the mobile device according to the techniques discussed herein. The process illustrated in FIG. 5 can be implemented using the mobile device 120 illustrated in FIGS. 1-3, unless otherwise specified. The authentication module 362 of the mobile device 120 can provide means for performing the various stages of the process illustrated in FIG. 5 unless otherwise specified. The process illustrated in FIG. 5 can be used to implement the generation of the second profile in stage 405 of the process illustrated in FIG. 4. The process illustrated in FIG. 5 can be performed during a learning period in which the authentication module 362 develops one or more short-term profiles and/or long-term profiles for the user of the mobile device 120.

User-related data can be for a predetermined period of time at the mobile device 120 (stage 505). The authentication module 362 can be configured to obtain data collected by the data collection module from the one or more sensors 220, the GNSS interface 265, and/or the I/O interface 270, and the authentication module 362 can use the data from one or more of these sources to generate one or more short-term profiles for the user of the mobile device. The authentication module 362 can be configured to collect the information for the one or more short-term user profiles during a training period in which the authentication module 362 learns about the expected behavior of the user of the mobile device 120. The authentication module 362 can be configured to use different types of data for different predetermined periods of time based on the type of user-related data. For example, the authentication module 362 can be configured to collect information related to a typing pattern of the user of the mobile device 120 for a first predetermined period of time and to collect information related to a swipe style of the user of the mobile device 120 for a second predetermined period of time. The first predetermined period of time may be longer than that of the second predetermined period of time, because the amount of time that the user takes to make a swipe gesture on a touchscreen of the mobile device 120 is likely to be much shorter than that which the user takes to type an input on the mobile device 120. The authentication module 362 can be configured to create a short-term profile based on the gait pattern of the user of the mobile device 120, which may be determined based on accelerometer data collected by the data collection module 364.

At least one short-term profile file of user behavior can be generated (stage 510). Each short-term profile can be associated with a least one type of interaction with the mobile device. The authentication module 362 can generate the short-term profile based on measurements collected from the user-related data gathered as the user of the mobile device 120 uses the device. The authentication module 362 can later compare the measurements included in the at least one short-term profile to measurements included in usage data obtained while monitoring the usage of the mobile device 120. The authentication module 362 can then trigger an authentication action responsive to measurements included in one or more short-term profiles deviating from the expected measurements by more than a predetermined threshold.

FIG. 6 is a flow diagram of a process for collecting user-related data at a mobile device according to the techniques discussed herein. The process illustrated in FIG. 6 can be implemented using the mobile device 120 illustrated in FIGS. 1-3, unless otherwise specified. The authentication module 362 of the mobile device 120 can provide means for performing the various stages of the process illustrated in FIG. 6 unless otherwise specified. The process illustrated in FIG. 6 can be used to implement stage 505 of the process illustrated in FIG. 5 and/or stage 705 of the process illustrated in FIG. 7, which is discussed in detail below. The process illustrated in FIG. 6 includes multiple stages in which user-related data can be collected. All of the stages may be included in some implementations. In other implementations, one or more of the stages illustrated in FIG. 6 may be omitted and/or additional stages may be included to collect additional user-related data.

Sensor data can be collected from one or more sensors of the mobile device 120 (stage 605). The data collection module 364 of the mobile device can be configured to collected data from one or more sensors, such as an accelerometer, an altimeter, a pressure sensor, a gyroscope, a magnetometer, and/or other sensors. The data collection module 364 can provide the sensor data to the authentication module 362, which can use the data to generate one or more short-term profiles and/or long-term profiles of an authorized user of the mobile device. The authentication module 362 can be configured to use the sensor data to generate either short-term or long-term profiles for the user of the mobile device that can include expected user behaviors, such as a gait pattern, swiping pattern, and/or typing pattern of the user of the mobile device. The gyroscope data can also be used to determine an orientation of the mobile device, which can be used to determine how and when the authorized user of the mobile device holds and/or carries the mobile device 120. The magnetometer data can be used to determine an expected orientation and/or heading of the mobile device 120 based on how the user of the mobile device holds the mobile device 120 and/or expected direction that the user of the mobile device is facing or traveling while holding the mobile device 120. The altimeter and/or pressure sensor can be used to determine an elevation of the mobile device 120 and/or whether the mobile device is located in an indoor or outdoor environment based on changes in pressure measured by the altimeter and/or pressure sensor.

Audio data can be collected from a microphone of the mobile device 120 (stage 610). The data collection module 364 of the mobile device can be configured to collected data from a microphone of the mobile device 120. The data collection module 364 can provide the sensor data to the authentication module 362, which can use the data to generate one or more short-term profiles and/or long-term profiles of an authorized user of the mobile device. For example, the audio data can be used to measure the voice characteristics of the authorized user of the mobile device. The audio data could also be used to determine a language and/or languages that are typically spoken by a user of the device and to include such information in the short-term and/or long-term profiles of the authorized user of the mobile device 120.

Tactile data from one or more user interface elements of the mobile device 120 (stage 615). The data collection module 364 of the mobile device can be configured to collected data from a touchscreen, keyboard, a button, or other tactile input, or combination thereof of the mobile device 120. The authentication module 362 can use the tactile information to generate one or more short-term profiles and/or one or more long-term profiles of how the user interacts with the mobile device 120. For example, the authentication module 362 can be configured to determine a typing profile based on key presses on the touchscreen or keyboard of the mobile device. The authentication module 362 can be configured to develop patterns of usage, indicating how often the user touches the touchscreen or a series of keys and/or buttons on the mobile device. The authentication module 362 can also be configured to determine a swipe pattern that the authorized user of the mobile device typically uses when interacting with the touchscreen of the mobile device, which may take into account the amount of pressure exerted on the touchscreen, where the user typically touches the touchscreen, and the speed of one or more typical touch gestures.

Figure 7:
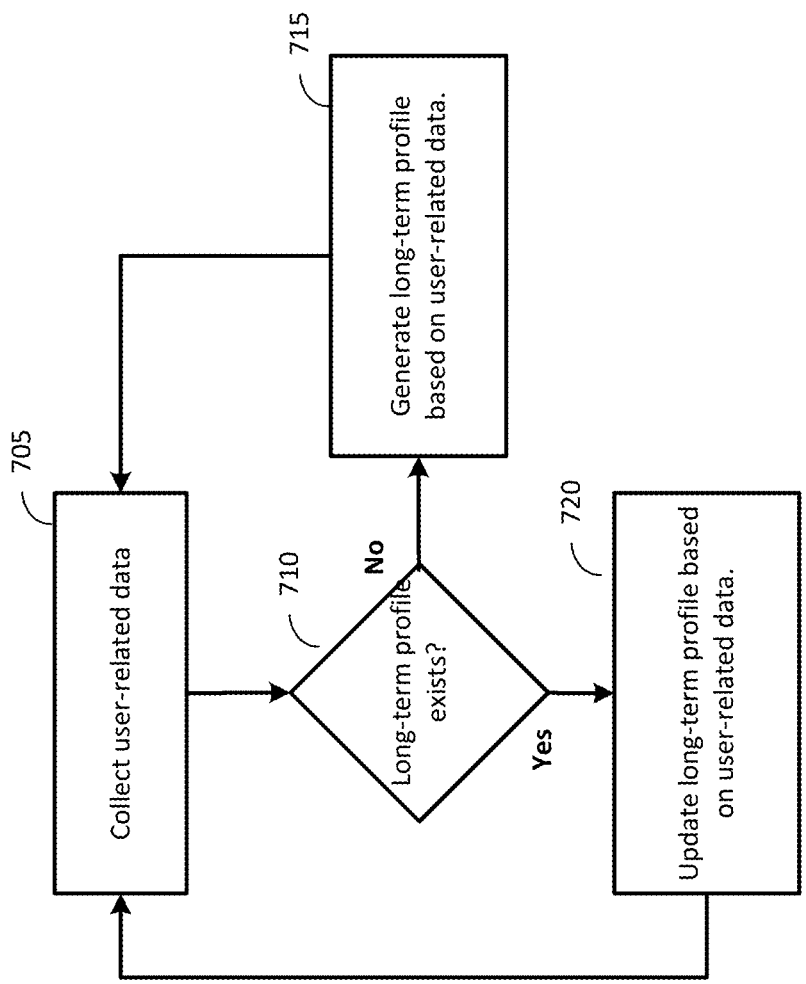
FIG. 7 is a flow diagram of a process for generating a long-term profile for a user of the mobile device according to the techniques discussed herein.

FIG. 7 is a flow diagram of a process for generating a long-term profile for a user of the mobile device according to the techniques discussed herein. The process illustrated in FIG. 7 can be implemented using the mobile device 120 illustrated in FIGS. 1-3, unless otherwise specified. The authentication module 362 of the mobile device 120 can provide means for performing the various stages of the process illustrated in FIG. 7 unless otherwise specified. The process illustrated in FIG. 7 can be used to implement the generation of the first profile in stage 405 of the process illustrated in FIG. 4.

User-related data can be collected at the mobile device 120 (stage 705). The user-related data may be collected during a training period in which the mobile device 120 is configured to learn expected behaviors of an authorized user of the mobile device 120. The authentication module 362 can be configured to obtain user-data collected by the data collection module from the one or more sensors 220, the GNSS interface 265, and/or the I/O interface 270, and the authentication module 362 can use the data from one or more of these sources to generate one or more long-term profiles for the user of the mobile device. The authentication module 362 can be configured to collect the information for the one or more long-term user profiles during a training period in which the authentication module 362 learns about the expected behavior of the user of the mobile device 120.

A determination can be made whether at least one-long term profile exists for the user of the mobile device 120 (stage 710). If no long-term profile currently exists, at least one long-term profile file of user behavior can be generated (stage 715). The long-term profile can be associated with a least one type of interaction with the mobile device or expected user behavior, and a long-term profile can be associated with more than one type of interaction with the mobile device or other expected user behavior. The long-term profile can be split in chunk of time and days since our behavior/agenda is time of day and day dependent (e.g. we do not necessarily wake-up at same time during week days and weekend). The authentication module 362 can generate the long-term profile based on measurements collected from the user-related data gathered as the user of the mobile device 120 uses the device. The authentication module 362 can also be configured to obtain additional information about the expected behavior of the user of the mobile device 120 through calendar information available on the mobile device or associated with one or more online accounts associated with the authorized user of the mobile device. The authentication module 362 can later compare the measurements included in the at least one long-term profile to measurements included in usage data obtained while monitoring the usage of the mobile device 120. The authentication module 362 can then trigger a strong authentication action responsive to measurements included in one or more long-term profiles deviating from the expected measurements by more than a predetermined threshold.

If a profile currently exists, the existing profile can be updated (stage 720). The authentication module 362 can be configured up update the long-term profile or profiles associated with the user of the mobile device 120 as additional information is collected over time. For example, the initial long-term profile for a user of the mobile device 120 may be vague with only a small amount of information about the user of the mobile device 120. But, as time passes and additional information is collected by the data collection module 364, the authentication module 362 can continue to generate a more complete profile of the expected behavior of the user. For example, the long-term profile can be updated with additional expected geographic location information, expected days and/or times associated with each of the expected geographic locations, expected device usage information, expected activities information, or a combination thereof.

The process illustrated in FIG. 7 can continue with stage 705 after completing stage 715 or stage 720. The authentication module 362 can be configured to continue to process usage behavior collected using the data collection module 364 and to continue to develop the long-term user profile or profiles over time.

FIG. 8 is a flow diagram of a process for performing an authentication action responsive to a long-term profile mismatch according to the techniques discussed herein. The process illustrated in FIG. 8 can be implemented using the mobile device 120 illustrated in FIGS. 1-3, unless otherwise specified. The authentication module 362 of the mobile device 120 can provide means for performing the various stages of the process illustrated in FIG. 8 unless otherwise specified. The process illustrated in FIG. 8 can be used to implement stage 430 of the process illustrated in FIG. 4, responsive to user behavior data deviating too far from the first profile (a long-term profile).

An authentication action associated with user behavior deviating from a long-term profile can be determined (stage 805). The authentication module 362 can be configured to determine a strong authentication action be performed responsive to the usage behavior of the user deviating from a long-term profile. The authentication module 362 can be configured to perform a specific strong authentication procedure any time that a deviation from a long-term profile is identified. The authentication module 362 can also be configured to select from a plurality of strong authentication procedures and determine one or more of these procedures to be performed.

The user of the mobile device 120 can be prompted to provide an authentication input based on the authentication action determined in stage 905 (stage 810). The type of authentication input can vary based on the type of authentication procedure. For example, the user of the mobile device may be required to provide a password or other identifier that is longer and more difficult to guess than a standard password, PIN, or swipe pattern that may be used to lock the mobile device. The authentication input may also comprise the user of the mobile device being required to answer a series of questions. For example, the authentication module 362 may present a series of questions that the user of the mobile device 120 must answer. The user of the mobile device 120 may have been prompted to provide answers to these questions at the time that the user's long-term profile was being developed and can include information that would be difficult for someone who is not the authorized user of the mobile device to guess. The authentication module 362 can also be configured to generate a series of questions based on past user behavior that would be difficult for someone other than the authorized user of the mobile device 120 to guess. For example, the authentication module 362 may present a series of questions regarding geographic areas visited, contacts, applications utilized, and/or other information that an authorized user of the mobile device 120 should be able to answer but would be difficult to guess. The authentication module 362 can also be configured to require the user of the mobile device 120 to obtain an access code or other unlock code from an external source, such an network service provider associated with the mobile device 120 or via an email or text to a backup account associated with the authorized user of the mobile device 120, which the user of the mobile device should be able to obtain and enter via a user interface of the mobile device 120. The authentication module 362 may also be configured to require one or more biometric inputs, such as a voice print, fingerprint, or photo of facial features which can be processed using facial recognition algorithms.

A determination whether the authentication input satisfies requirements of the authentication action can be determined (stage 815). The authentication module 362 can be configured to determine whether the one or more authentication inputs requested by authentication module 362 have been provided by the user. The authentication module 362 can be configured to present more than one authentication option. If the user fails to provide a satisfactory response to one or more authentication actions, the authentication module 362 may still authentication the user if the still able to successfully provide responses to a threshold number of authentication actions.

FIG. 9 is a flow diagram of a process for performing an authentication action responsive to a short-term profile mismatch according to the techniques discussed herein. The process illustrated in FIG. 8 can be implemented using the mobile device 120 illustrated in FIGS. 1-3, unless otherwise specified. The authentication module 362 of the mobile device 120 can provide means for performing the various stages of the process illustrated in FIG. 8 unless otherwise specified. The process illustrated in FIG. 8 can be used to implement stage 435 of the process illustrated in FIG. 4, responsive to user behavior data deviating too far from the second profile (a short-term profile).

An authentication action associated with user behavior deviating from a short-term profile can be determined (stage 905). The authentication module 362 can be configured to determine an authentication action to be performed responsive to the usage behavior of the user deviating from a short-term profile. The authentication module 362 can be configured to perform an authentication procedure any time that a deviation from a short-term profile is identified. The authentication module 362 can also be configured to select from a plurality of authentication procedures and determine one or more of these procedures to be performed. The authentication procedure to be performed does not need to be as strong as the strong authentication procedures performed in response to a deviation from a long-term profile. If the user behavior has deviated too far from the long-term profile, the procedure illustrated in FIG. 8 can be performed to perform a strong authentication procedure for verifying the identity of the user of the mobile device 120.

The user of the mobile device 120 can be prompted to provide an authentication input based on the authentication action determined in stage 905 (stage 910). The type of authentication input can vary based on the type of authentication procedure determined in stage 905. For example, the user of the mobile device may be required to enter an unlock password, PIN, or swipe pattern that is typically used to lock the mobile device. The authentication module 362 may require that the user of the mobile device scan a fingerprint using a fingerprint scanner of the mobile device. Other types of inputs may also be used to verify the user of the mobile device 120.

A determination whether the authentication input satisfies the requirements of the authentication action can be determined (stage 915). The authentication module 362 can be configured determine whether the one or more authentication inputs requested by authentication module 362 have been provided by the user. The authentication module 362 can be configured to present more than one authentication option. If the user fails to provide a satisfactory response to one or more authentication actions, the authentication module 362 may still authenticate the user if the user is still able to successfully provide responses to a threshold number of authentication actions.

The authentication module 362 can be configured to update one or more short-term profiles associated with the user of the mobile device responsive to the user of the mobile device providing a satisfactory answer to the authentication action. The authentication module 362 can also be configured to update the one or more short-term profiles associated with the user of the mobile device 120 responsive to the usage data collected by the authentication module 362 varying from the one or more short-term profiles more than a predetermined number of times and the user providing a satisfactory response to the authentication procedure each time.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for authenticating a user of a mobile device, the method comprising:
    generating a first profile and second profile of user behavior for an authorized user of the mobile device, the first profile comprising a first type of profile having at least a first duration and comprising information indicative of expected behavior of the authorized user over at least the first duration, the second profile comprising a second type of profile having a second duration that is shorter than the first duration and comprising information indicative of expected behavior of the authorized user over at least the second duration;
    monitoring user behavior to generate usage behavior data;
    comparing the usage behavior data to the first profile and the second profile;
    performing a first type of authentication action responsive to the usage behavior data deviating from the first profile; and
    performing a second type of authentication action responsive to the usage behavior data deviating from the second profile.

2. The method of claim 1, wherein monitoring the user behavior to generate the usage behavior data comprises monitoring the user behavior while the mobile device is in a sleep state.

3. The method of claim 1, wherein performing the first type of authentication action or the second type of authentication action comprises performing an authentication procedure which locks the mobile device until an authentication input is received by the mobile device.

4. The method of claim 3, wherein performing the first type of authentication action comprises performing a strong authentication procedure which locks the mobile device until a strong authentication input is received by the mobile device, the strong authentication input being different from the authentication input required in the second type of authentication action.

5. The method of claim 1, wherein generating the second profile comprises:
collecting user-related data for a predetermined period of time at the mobile device during a training period; and
generating the second profile based on the user-related data.

6. The method of claim 1, wherein generating the first profile comprises:
collecting user-related data at the mobile device during a training period; and
generating the first profile based on the user-related data.

7. The method of claim 1, wherein performing the second type of authentication action comprises:
determining an authentication action associated with the user behavior;
receiving an authentication input based on the authentication action; and
determining whether the authentication input satisfies requirements of the authentication action.

8. The method of claim 1, wherein performing the first type of authentication action comprises:
determining a strong authentication action associated with the user behavior;
receiving an authentication input based on the strong authentication action; and
determining whether the authentication input satisfies requirements of the strong authentication action.

9. The method of claim 1, further comprising:
refining the first profile based at least in part on the usage behavior data.

10. An apparatus comprising:
means for generating a first profile and second profile of user behavior for an authorized user of the mobile device, the first profile comprising a first type of profile having at least a first duration and comprising information indicative of expected behavior of the authorized user over at least the first duration, the second profile comprising a second type of profile having a second duration that is shorter than the first duration and comprising information indicative of expected behavior of the authorized user over at least the second duration;
means for monitoring user behavior to generate usage behavior data;
means for comparing the usage behavior data to the first profile and the second profile;
means for performing a first type of authentication action responsive to the usage behavior data deviating from the first profile; and
means for performing a second type of authentication action responsive to the usage behavior data deviating from the second profile.

11. The apparatus of claim 10, wherein the means for monitoring the user behavior to generate the usage behavior data comprises means for monitoring the user behavior while the mobile device is in a sleep state.

12. The apparatus of claim 10, wherein the means for performing the first type of authentication action or the second type of authentication action comprises means for performing an authentication procedure which locks the mobile device until an authentication input is received by the mobile device.

13. The apparatus of claim 12, wherein the means for performing the first type of authentication action comprises means for performing a strong authentication procedure which locks the mobile device until a strong authentication input is received by the mobile device, the strong authentication input being different from the authentication input required in the second type of authentication action.

14. The apparatus of claim 10, wherein the means for generating the second profile comprises:
means for collecting user-related data for a predetermined period of time at the mobile device during a training period; and
means for generating the second profile based on the user-related data.

15. The apparatus of claim 10, wherein the means for generating the first profile comprises:
means for collecting user-related data at the mobile device during a training period; and
means for generating the first profile based on the user-related data.

16. The apparatus of claim 10, wherein the means for performing the second type of authentication action comprises:
means for determining an authentication action associated with the user behavior;
means for receiving an authentication input based on the authentication action; and
means for determining whether the authentication input satisfies requirements of the authentication action.

17. The apparatus of claim 10, wherein the means for performing the first type of authentication action comprises:
means for determining a strong authentication action associated with the user behavior;
means for receiving an authentication input based on the strong authentication action; and
means for determining whether the authentication input satisfies requirements of the strong authentication action.

18. A computing device comprising:
a processor configured to:
generate a first profile and second profile of user behavior for an authorized user of the mobile device, the first profile comprising a first type of profile having at least a first duration and comprising information indicative of expected behavior of the authorized user over at least the first duration, the second profile comprising a second type of profile having a second duration that is shorter than the first duration and comprising information indicative of expected behavior of the authorized user over at least the second duration;
monitor user behavior to generate usage behavior data;
compare the usage behavior data to the first profile and the second profile;
perform a first type of authentication action responsive to the usage behavior data deviating from the first profile; and
perform a second type of authentication action responsive to the usage behavior data deviating from the second profile.

19. The computing device of claim 18, wherein the processor is configured to monitor the user behavior while the mobile device is in a sleep state.

20. The computing device of claim 18, wherein the processor being configured to perform the first type of authentication action or the second type of authentication action is configured to perform an authentication procedure which locks the mobile device until an authentication input is received by the mobile device.

21. The computing device of claim 20, wherein the processor being configured to perform the first type of authentication action is configured to perform a strong authentication procedure which locks the mobile device until a strong authentication input is received by the mobile device, the strong authentication input being different from the authentication input required in the second type of authentication action.

22. The computing device of claim 18, wherein the processor being configured to generate the second profile is configured to:
collect user-related data for a predetermined period of time at the mobile device during a training period; and
generate the second profile based on the user-related data.

23. The computing device of claim 18, wherein the processor being configured to generate the first profile is configured to:
collect user-related data at the mobile device during a training period; and
generate the first profile based on the user-related data.

24. The computing device of claim 18, wherein the processor being configured to perform the second type of authentication action is configured to:
determine an authentication action associated with the user behavior;
receive an authentication input based on the authentication action; and
determine whether the authentication input satisfies requirements of the authentication action.

25. The computing device of claim 18, wherein the processor being configured to perform the first type of authentication action is configured to:
determine a strong authentication action associated with the user behavior;
receive an authentication input based on the strong authentication action; and
determine whether the authentication input satisfies requirements of the strong authentication action.

26. A non-transitory, computer-readable medium, having stored thereon computer-readable instructions for authenticating a user of a mobile device, comprising instructions configured to cause a computer to:
generate a first profile and second profile of user behavior for an authorized user of the mobile device, the first profile comprising a first type of profile having at least a first duration and comprising information indicative of expected behavior of the authorized user over at least the first duration, the second profile comprising a second type of profile having a second duration that is shorter than the first duration and comprising information indicative of expected behavior of the authorized user over at least the second duration;
monitor user behavior to generate usage behavior data;
compare the usage behavior data to the first profile and the second profile;
perform a first type of authentication action responsive to the usage behavior data deviating from the first profile; and
perform a second type of authentication action responsive to the usage behavior data deviating from the second profile.

27. The non-transitory, computer-readable medium of claim 26, wherein the instructions configured to cause the computer to monitor the user behavior to generate the usage behavior data comprise instructions configured to cause the computer to monitor the user behavior while the mobile device is in a sleep state.

28. The non-transitory, computer-readable medium of claim 26, wherein the instructions configured to cause the computer to perform the first type of authentication action or the second type of authentication action comprise instructions configured to cause the computer to perform an authentication procedure which locks the mobile device until an authentication input is received by the mobile device.

29. The non-transitory, computer-readable medium of claim 28, wherein the instructions configured to cause the computer to perform the first type of authentication action comprise instructions configured to cause the computer to perform a strong authentication procedure which locks the mobile device until a strong authentication input is received by the mobile device, the strong authentication input being different from the authentication input required in the second type of authentication action.

30. The non-transitory, computer-readable medium of claim 26, wherein the instructions configured to cause the computer to generate the second profile comprise instructions configured to cause the computer to:
collect user-related data for a predetermined period of time at the mobile device during a training period; and
generate the second profile based on the user-related data.

31. The non-transitory, computer-readable medium of claim 26, wherein the instructions configured to cause the computer to generate the second profile comprise instructions configured to cause the computer to:
collect user-related data at the mobile device during a training period; and
generate the second profile based on the user-related data.

32. The non-transitory, computer-readable medium of claim 26, wherein the instructions configured to cause the computer to perform the second type of authentication action responsive to the usage behavior data deviating from the second profile comprise instructions configured to cause the computer to:
determine an authentication action associated with the user behavior;
receive an authentication input based on the authentication action; and
determine whether the authentication input satisfies requirements of the authentication action.

33. The non-transitory, computer-readable medium of claim 26, wherein the instructions configured to cause the computer to perform the first type of authentication action comprise instructions configured to cause the computer to:
determine a strong authentication action associated with the user behavior;
receive an authentication input based on the strong authentication action; and
determine whether the authentication input satisfies requirements of the strong authentication action.

* * * * *